(12) United States Patent
Parkola et al.

(10) Patent No.: US 7,805,070 B2
(45) Date of Patent: Sep. 28, 2010

(54) IMAGE SENSOR INSPECTION DEVICE

(75) Inventors: Walter Parkola, El Cajon, CA (US); Martin J. Wood, Ramona, CA (US)

(73) Assignee: Apical Industries, Inc., Poway, CA (US)

( * ) Notice: Subject to any disclaimer, the term of this patent is extended or adjusted under 35 U.S.C. 154(b) by 1036 days.

(21) Appl. No.: 11/529,667

(22) Filed: Sep. 27, 2006

(65) Prior Publication Data

US 2008/0075452 A1 Mar. 27, 2008

(51) Int. Cl.
*G03B 19/00* (2006.01)
*G03B 15/06* (2006.01)
*G03B 17/00* (2006.01)
*G02B 7/02* (2006.01)
*H04N 7/18* (2006.01)

(52) U.S. Cl. .................. 396/429; 396/199; 396/531; 359/828; 348/131; 348/132

(58) Field of Classification Search .............. 396/429, 396/529, 530, 531, 532, 533; 348/552, 131, 348/132; 359/819, 827, 828
See application file for complete search history.

(56) References Cited

U.S. PATENT DOCUMENTS

| | | | |
|---|---|---|---|
| 4,844,071 A | 7/1989 | Chen et al. | |
| 5,546,231 A | 8/1996 | Sato | |
| 5,757,486 A | 5/1998 | Marcus et al. | |
| D439,922 S | 4/2001 | Kumakura | |
| 6,327,078 B1 | 12/2001 | Lee | |
| 6,381,024 B1 | 4/2002 | Marcus et al. | |
| 6,463,222 B1 | 10/2002 | Ito et al. | |
| D497,174 S | 10/2004 | Omino et al. | |
| 2002/0154811 A1 | 10/2002 | Katsuta et al. | |
| 2003/0193604 A1 | 10/2003 | Robins | |
| 2005/0031338 A1 | 2/2005 | Koyama et al. | |
| 2005/0235510 A1 | 10/2005 | Ly | |
| 2006/0095144 A1 | 5/2006 | Good | |
| 2006/0104627 A1 | 5/2006 | Park | |
| 2006/0216023 A1 * | 9/2006 | Tokiwa et al. | 396/532 |

FOREIGN PATENT DOCUMENTS

| | | |
|---|---|---|
| JP | 406319021 A | 11/1994 |
| JP | 11145229 A | 5/1995 |
| JP | 02002314054 A | 10/2002 |
| JP | 2005024905 A | 1/2005 |
| JP | 2005175363 A | 6/2005 |
| JP | 2005221595 A | 8/2005 |
| WO | 2008070122 A | 6/2008 |

* cited by examiner

*Primary Examiner*—Rochelle-Ann J Blackman
(74) *Attorney, Agent, or Firm*—Peter K. Hahn; Luce, Forward, Hamilton & Scripps, LLP

(57) ABSTRACT

An inspection device for visually inspecting an image sensor of a digital recording device, such as a digital camera. The inspection device includes a tubular housing and a lens mounted therein. The housing is configured to engage a lens interface of a camera body. A lighting assembly is provided that is configured to illuminate the image sensor when the inspection device is coupled to a digital camera body so that the image sensor may be visually inspected for contamination.

20 Claims, 2 Drawing Sheets

US 7,805,070 B2

IMAGE SENSOR INSPECTION DEVICE

FIELD OF THE INVENTION

The present invention is generally directed to inspection devices for digital image recorders. More specifically, the present invention relates to a device that is used to inspect the image sensor of a digital image recorder, such as a digital camera.

BACKGROUND OF THE INVENTION

Digital cameras have become pervasive in photography since their commercial introduction in the 1990s. In fact, many camera manufacturers have ceased production and/or development of conventional film cameras and focused entirely on digital models. Digital cameras provide various conveniences over film cameras that have increased their popularity. For example, digital cameras provide images that are readily downloadable and printable without requiring a photo lab. In addition, digital cameras generally include a liquid crystal display that provides instant feedback as to the image quality. Furthermore, digital cameras allow a user to experiment and view the outcome without the expense of exhausting film supply. If a digital image is found undesirable it may be deleted and a new image may be recorded in its place. Digital cameras also allow the user to change film speed without being required to change the recording media. In a film camera, the film speed may only be changed by replacing the film with film having the desired film speed.

An image sensor is used in digital cameras in place of film to record an image that is projected into the camera. The image sensor is generally a charge-coupled device (CCD) or a complimentary metal-oxide semiconductor (CMOS) sensor that is built into the camera body during manufacture.

Those sensors are oftentimes exposed to dust particles, especially when the camera is a digital single-lens reflex camera (DSLR) that is configured to receive replaceable lenses. However, dust particles incident on the sensor reduces image quality. Image sensors are not designed to be replaced so the exposure of the sensor to dust requires sensor cleaning. Cleaning the image sensor exposes the sensor to the risk of damage so manual sensor cleaning is preferably undertaken only when sensor contamination has reached significant levels. Because of the size of dust particles and accessibility to the sensor, inspection of the sensor to determine the level of contamination is not a trivial task.

A common method of inspecting a digital camera sensor to determine the level of contamination is to take a picture of a uniformly illuminated surface. The image is taken with a small aperture setting, e.g., f/22-f/45 and with the lens focused on the closest focus setting. The image is then reviewed on a computer monitor to determine the level of contamination. Using that technique, dust particles on the sensor produce visible spots on the image. However, the image provides a map of the dust particles that is flipped 180 degrees from top to bottom. Based on that image a user may determine whether the contamination is substantial enough to require cleaning. It has also been suggested to utilize the same technique, but to manipulate the image with image editing software to improve the dust particle mapping.

Such methods present various disadvantages. One disadvantage of the method is that it requires access to a monitor to adequately view the image of the dust particles, but in many situations, such as when traveling, a monitor may not be available. In addition, if the user desires to target the dirtiest portions of the sensor, it requires the user to correlate the locations presented in the flipped image with the actual particle locations on the sensor. Furthermore, such a method does not clearly indicate whether the contaminants are on the sensor, a lens or a filter surface. A still further disadvantage is that if image processing is utilized, such software may not be available or requires special knowledge to adequately perform the processing steps.

In view of the above, there exists a need for a sensor inspection device that is compact and that does not require use of a monitor or image processing to perform the inspection.

SUMMARY OF THE INVENTION

The present invention provides an image sensor inspection device that does not require a monitor or image processing to determine the cleanliness of the image sensor. In particular, the inspection device allows a user to visually inspect the image sensor directly to determine if cleaning the sensor is required.

According to an aspect of the present invention, an inspection device is coupled with a camera body and allows the user to visually inspect the camera's image sensor. In an embodiment, the inspection device includes a housing and a fixed power lens suspended therein. The housing is configured to engage a lens interface of the camera body. The inspection device also includes a lighting assembly configured to illuminate the sensor so that debris present on the sensor may be easily viewed.

According to yet another aspect of the present invention, the inspection device includes a second lens, i.e., a protective lens. The second lens is suspended in the housing and encloses a chamber between the lenses. Furthermore, according to yet another aspect of the present embodiment, the inspection device includes a mounting portion that is configured so that the inspection device may be mounted to camera bodies having differently configured lens interfaces, such as those offered by different camera manufacturers.

BRIEF DISCUSSION OF THE DRAWINGS

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
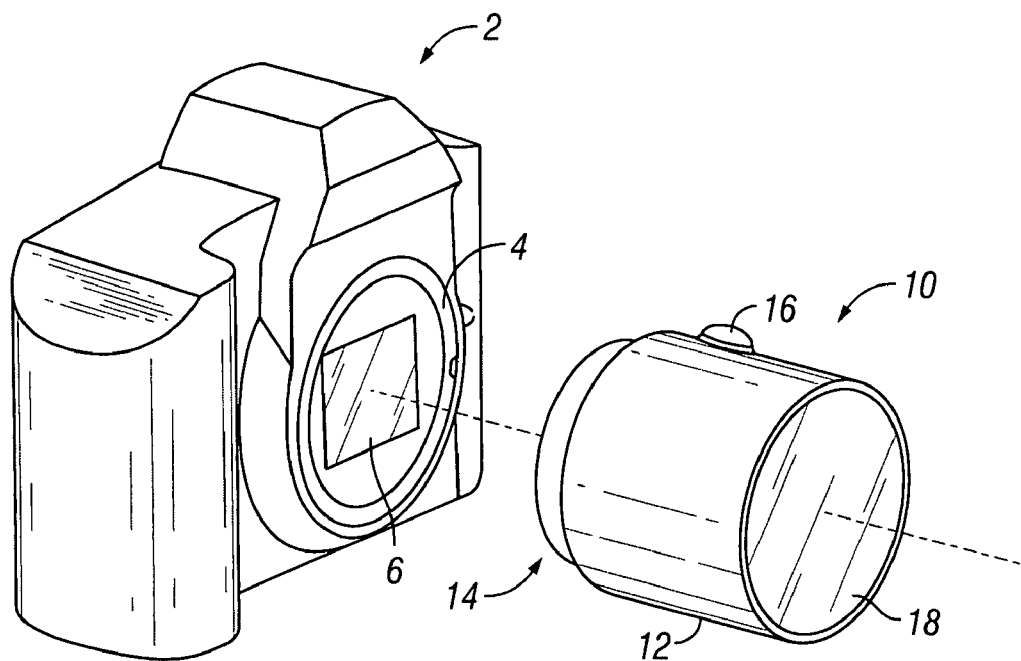
FIG. 1 is a schematic perspective view of the inspection device aligned with a camera body.

Referring to FIG. 1, an inspection device 10 especially advantageous for visually inspecting image sensors in DSLRs will be described. Inspection device 10 is configured to be coupled to a camera body 2 at a lens interface 4 so that an image sensor 6 housed within body 2 may be visually inspected. Lens interface 4 is a portion of body 2 that in normal photographic use allows interchangeable lenses to be removably coupled to body 2. Inspection device 10 is coupled to camera body 2 at lens interface 4 so that the longitudinal axis of inspection device 10 is aligned with an optical axis of camera body 2. It should be appreciated that camera manufacturers generally have adopted specific configurations that allow a complimentary flanged mating portion of an interchangeable lens to be locked in place on camera body 2.

Inspection device 10 includes a housing 12, a mating portion 14 and a lighting control 16. As shown, inspection device may also include a protective lens 18 mounted to an end of housing 12 opposite mating portion 14. Housing 12 holds and protects the various components of inspection device 10 during use and storage. Housing 12 is generally an elongate body that includes a central lumen that is sized to receive optical components that will be described in greater detail below.

Housing 12 may have any length desired that is sufficient to house the optical components of inspection device 10. The length of housing 12, as shown, is approximately the length of a lens having a small focal length such as a wide angle lens so that a user is able to conveniently store inspection device 10 as they would any short lens. For example, housing 12 may have a length in the range of 1-8 inches.

Housing 12 may be made of any desired material such as brass, aluminum, steel or plastic. It should be appreciated that although housing 12 is monolithic in the embodiment shown, housing 12 may be assembled from multiple components, constructed from the same or different materials, that may be threaded, welded or otherwise adhered together. In addition, it should be appreciated that housing 12 may be adjustable so that the distance between the optical components (e.g., a primary lens 20) and mating portion 14 may be changed by the user. One or more coatings may be applied to the interior surface of housing 12 for protection and to reduce reflection and flare.

Mating portion 14 is included on inspection device 10 and is configured so that inspection device 10 may be temporarily coupled to lens interface 4 of camera body 2. Mating portion 14 may be configured to engage and lock onto camera body 12 as would a conventional interchangeable lens, or mating portion may be configured to engage lens interface 4 without locking onto camera body 2. In addition, mating portion 14 may be configured so that it includes portions that can engage camera bodies 2 that are produced by different manufacturers. For example, mating portion 14 may include portions having different diameters so that a single inspection device 10 may be mounted to camera bodies produced by either Canon or Nikon, which have traditionally had differently configured lens interfaces.

Lighting control 16 is coupled to and may extend through a side wall of housing 12 so that a user may trigger an internal lighting assembly when inspection device 10 is coupled to body 2. In the present embodiment, lighting control 16 is a push button that may be easily depressed by a user so that image sensor 6 may be illuminated for easy inspection. It should be appreciated that lighting control 16 may be any type of switch or sensor that allows a user to selectively turn a lighting assembly off and on. A cover included in lighting control 16 may be ultrasonically welded to housing 12.

Figure 2:
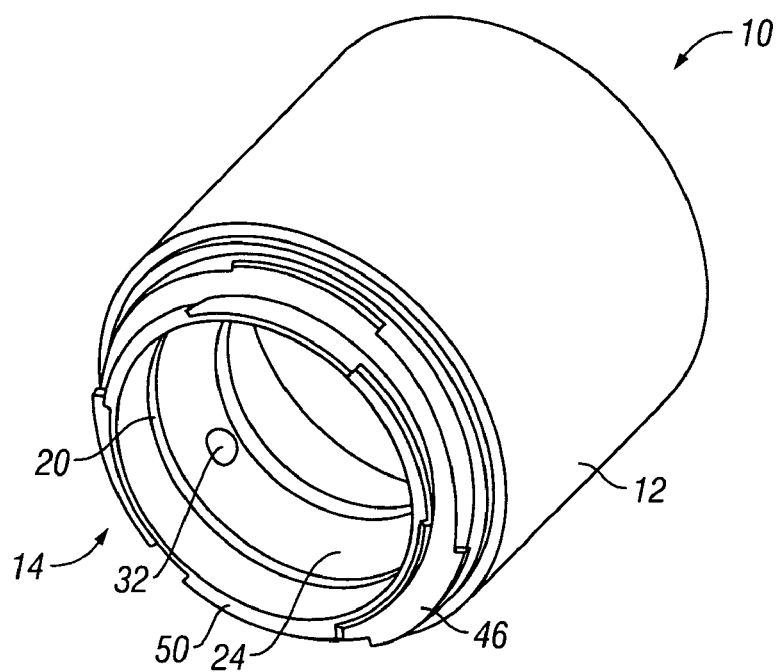
FIG. 2 is a perspective view of an embodiment of the inspection device.
Figure 3:
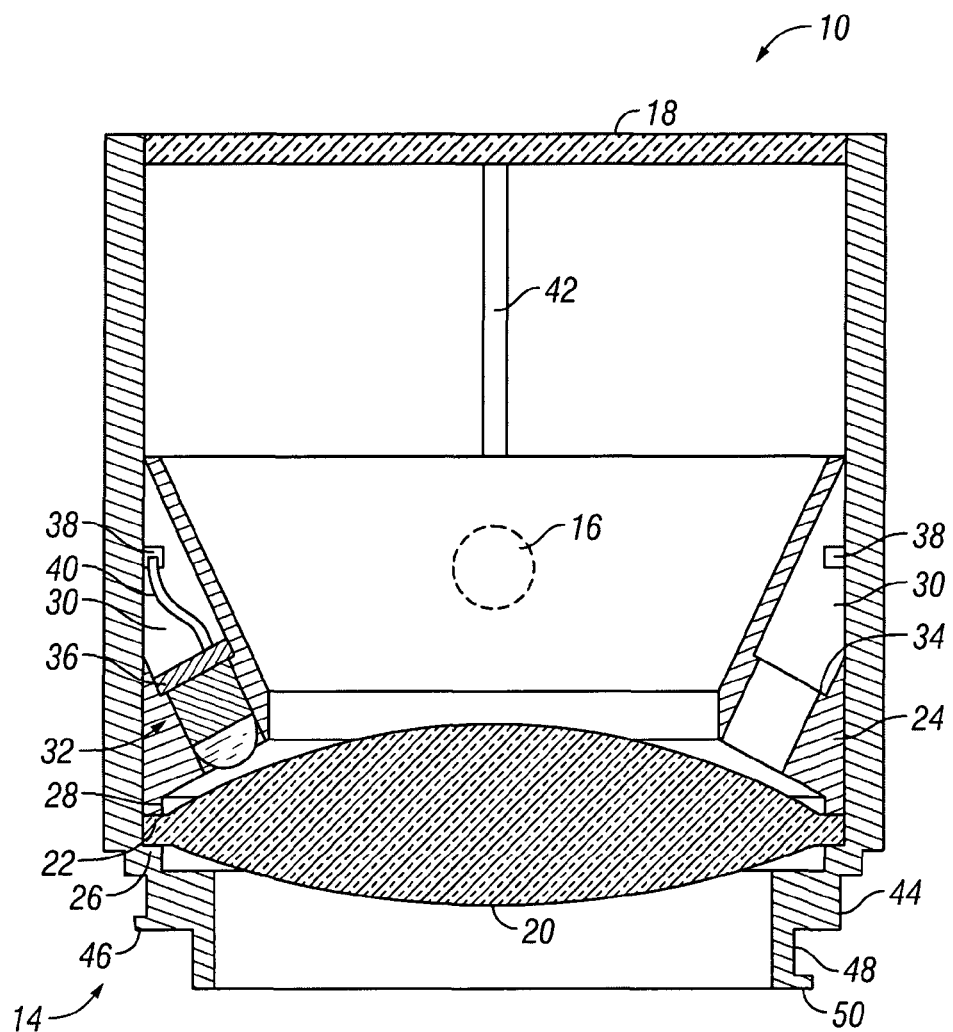
FIG. 3 is a cross-sectional view of the inspection device of FIG. 1.

Referring to FIGS. 2 and 3, inspection device 10 will be further described. As described above, inspection device generally includes housing 12 that holds and protects the optical elements of inspection device 10. Primary lens 20 is held within housing 12 and provides magnification for visually inspecting image sensor 6. Primary lens 20 is preferably a fixed power lens that is aspherical.

Lens 20 includes a circumferential flange 22 that allows lens 20 to be held in place by a retaining ring 24. In particular, lens 20 may be inserted into housing 12 so that lens flange 22 abuts a shoulder 26 of housing 12. After lens 20 is inserted, retaining ring 24 is inserted into housing and a lens retaining flange 28 of retaining ring abuts lens flange 22 so that lens flange 22 is sandwiched between shoulder 26 and retaining flange 28. Retaining ring 24 is then coupled to housing 12, such as by an adhesive. Furthermore it will be appreciated that lens 20 may be attached in a manner that allows movement of the lens with respect to housing 12 to make focal point adjustments.

Retaining ring 24 is configured to house a lighting assembly that may be controlled by a user. In the present embodiment, retaining ring 24 includes a plurality of angled lighting bores 30 that are configured to receive a plurality of light sources, such as light-emitting diodes (LED) 32. The orientation of lighting bores 30 assures that LEDs 32 are pointed as desired radially inward and toward image sensor 6 when inspection device is coupled to camera body 2.

As shown, lighting bores 30 may include shoulders 34 that engage a flange 36 included on LEDs 32 so that the position of of LEDs 32 within bores 30 is controlled. Preferably, LEDs 32 are positioned proximal to the surface of primary lens 20 to provide a greater angle of illumination that is cast upon the surface of image sensor 6. It will be appreciated that any number of LEDs 32 may be included and they may be mounted with different angles of line of sight to support different lens focal points.

A circumferential channel 38 is also included on retaining ring 24 that defines a conduit between retaining ring 24 and housing 12. Channel 38 is configured so that it intersects and is opened within lighting bores 30. Wires 40 are routed from LEDs 32 to lighting control 16 and a power source (not shown) through channel 38 so that wires 40 do not interfere with the fit of retaining ring 24 in housing 12. It should be appreciated that the power source may be any known power source, such as one or more batteries, and it may be mounted anywhere on or in inspection device 10, such as external of housing 12 or within retaining ring 24. Preferably, wires 40 are included in a flex-circuit that is extended through channel 38 to a switch and coin cell battery located in lighting control 16 that is mounted on the outside of housing 12.

Although in the present embodiment a plurality of LEDs are included, any light source may be included in inspection device 10. Furthermore, any number of light sources may be included and if a plurality of light sources are included they may be distributed through inspection device 10 in any way. Preferably, a pair of LEDs are included and spaced 180 degrees apart from one another as shown. It should also be appreciated that the light sources may provide any color or wavelength of light desired. Furthermore, it should be appreciated that each light source may be adjustable for intensity and/or color.

An alignment feature may also be included on the outer surface of retaining ring 24. The alignment feature may be provided so that retaining ring 24 can be easily aligned within housing 12. In the illustrated embodiment, the alignment feature is a tab (not shown) that is received within an alignment channel 42 included in the interior of housing 12. The alignment features are used to properly align retaining ring 24 within housing 12 so that lighting control 16 is positioned properly with respect to the portion of the lighting assembly housed by retaining ring.

As described above, mating portion 14 is included on housing 12 and is configured so that inspection device 10 may be temporarily coupled to lens interface 4 of body 2. In the present embodiment, mating portion 14 includes dual concentric flanges so that inspection device 10 may be coupled to camera bodies having different lens interface configurations. A first flange 44 extends from housing 12 and includes a plurality of tabs 46 that extend radially outward from flange 44. The outer diameter of flange 44 and the size of tabs 46 are selected to mate with a first camera body lens interface design. A second flange 48 extends from first flange 44 and includes a plurality of tabs 50 that extend radially outward from flange 48. Tabs 50 have an outer diameter that is preferably smaller than the outer diameter of first flange 44 so that tabs 50 will not hinder coupling a camera body with first flange 44. In addition, the outer diameter of second flange 48 and the size of tabs 50 are selected to mate with a second camera body lens interface design.

It should be appreciated that tabs 46, 50 may be tapered so that rotation of inspection device 10 relative to camera body 2 about the longitudinal axis of inspection device 10 causes inspection device 10 and camera body 2 to be drawn together and locked together. In addition, it should be appreciated that tabs 46, 50 may be tapered in different directions so that rotation of inspection device 10 may lock into different camera bodies lens interface designs by relative rotation of inspection device 10 and camera body 2 in different directions. For example, tabs 46, 50 may be configured so that inspection device 10 locks in Nikon camera bodies by counterclockwise rotation and in Canon camera bodies by clockwise rotation.

It should further be appreciated that any releasable locking mechanism may be included in addition to, or in lieu of, tabs 46, 50. For example, a retractable body may be included on either the camera body or inspection device that selectively extends into a dimple or cavity of the other. It should be appreciated that mating portion 14 may be configured to engage any lens interface design desired.

As a further alternative, tabs 46, 50 may be omitted so that inspection device 10 is simply held against lens interface 4 of camera body 2. In such an embodiment, inspection device 10 is not locked with camera body, but is held by the user against lens interface 4 during inspection. Such a configuration may be especially desirable for quality control inspectors at camera manufacturers so that there is less potential for wear on lens interface 4.

Inspection device 10 also preferably includes protective lens 18 coupled to housing 12 at an end of housing 12 that is opposite mating portion 14. Protective lens 18 is sealed with housing to prevent contaminants from entering the interior of inspection device 10. Protective lens 18 may be a clear lens, a polarizer filter or any other filter that permits the user to view image sensor 6. It should be appreciated that any type of filter may be used. It should be appreciated that a filter mount may be included on housing so that a removeable filter may be used in conjunction with protective lens 18. Protective lens 18 preferably is bonded in place on housing 12. However, it will be appreciated that protective lens 18 may alternatively be held in place with a retaining ring.

Protective lens 18 and primary lens 20 may be constructed from any material known in the art sufficient for optical lenses. For example, lenses 18, 20 may be constructed from optical glass, plastic, or bonded glass and resin. Furthermore, lenses 18, 20 may be coated to provide scratch resistance, to prevent reflections, to provide desired color balance or to provide any other desired property.

It should also be appreciated that the mating portion may alternatively be configured so that it is removable from the housing of the inspection device. Such a configuration allows the inspection device to be tailored to a specific lens interface by replacing the mating portion. As a result, a single inspection device may be used with camera bodies having many different lens interface configurations simply by attaching a complimentary mating portion to the housing. The mating portion may be attached to the housing by any removable method. For example, the mating portion may be threaded to the housing or a tab and slot engagement may be utilized. An inspection device kit may be provided that includes a plurality of different removable mating portions. Covers may also be provided that are configured to mount to either end of the inspection device when it is not in use.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

What is claimed is:

1. An image sensor inspection device, comprising:
   a tubular body;
   a lens mounted in the tubular body;
   a camera mating portion disposed on an end of the tubular body, wherein the camera mating portion is configured to mate with a lens interface of a camera body;
   a lighting assembly disposed within the tubular body and configured to illuminate an image sensor disposed in the camera body; and
   a lighting control configured to be accessible by a user on an external surface of the housing.

2. The inspection device of claim 1, wherein the lens is a fixed power lens.

3. The inspection device of claim 2, wherein the lens is aspherical.

4. The inspection device of claim 1, wherein the lighting assembly is a plurality of light-emitting diodes.

5. The inspection device of claim 4, wherein the plurality of light-emitting diodes are equally spaced circumferentially within the housing.

6. The inspection device of claim 1, further comprising a retaining ring, wherein a circumferential portion of the lens is interposed between the retaining ring and a shoulder included in the housing.

7. The inspection device of claim 6, wherein at least one light source of the lighting assembly extends through the retaining ring.

8. The inspection device of claim 7, wherein the retaining ring includes a circumferential channel and wires of the light source are routed through the channel.

9. The inspection device of claim 1, further comprising a protective lens coupled to the housing on an end of the housing that is opposite the camera mating portion.

10. The inspection device of claim 9, wherein the protective lens is a clear lens.

11. The inspection device of claim 9, wherein the protective lens is a polarized filter.

12. The inspection device of claim 1, wherein the camera mating portion includes a plurality of concentric flanges configured to couple to a plurality of configurations of camera lens interface.

13. The inspection device of claim 1, wherein the camera mating portion includes a flange that includes a plurality of locking tabs configured to engage and lock the lens interface of the camera body.

14. The inspection device of claim 1, wherein the camera mating portion is removable from the housing.

15. The inspection device of claim 1, wherein the camera mating portion is monolithic with the housing.

16. An image sensor inspection device, comprising:
a tubular body including a shoulder;
a retaining ring disposed within the tubular body;
a lens including a circumferential portion that is sandwiched between the retaining ring and the shoulder;
a camera mating portion disposed on an end of the tubular body, wherein the camera mating portion is configured to mate with a lens interface of a camera body; and
a lighting assembly including a light source, wherein the lighting assembly is disposed at least partially within the retaining ring so that the light source is disposed adjacent the lens and is oriented such that light is directed radially inward toward an image sensor in the camera body.

17. The inspection device of claim 16, wherein the lighting assembly includes a pair of light-emitting diodes disposed in bores included in the retaining ring and the pair of light-emitting diodes are spaced 180 degrees apart from each other.

18. An image sensor inspection device kit, comprising:
a tubular body;
a lens mounted in the tubular body;
a camera mating portion disposed on an end of the tubular body, wherein the camera mating portion is configured to mate with a lens interface of a camera body; and
a lighting assembly disposed within the tubular body and oriented such that light is directed radially inward to illuminate an image sensor disposed in the camera body.

19. The inspection device kit of claim 18, wherein the camera mating portion comprises a plurality of camera mating portions configured to be removably coupled to an end of the tubular body.

20. The inspection device kit of claim 19, wherein the plurality of camera mating portions are configured to thread onto an end of the tubular body.

* * * * *